Sept. 6, 1966 J. R. WINCKLER ET AL 3,270,987
BALLOON STRUCTURE WITH DISTRIBUTED EXCESS MATERIAL
Filed Dec. 14, 1964
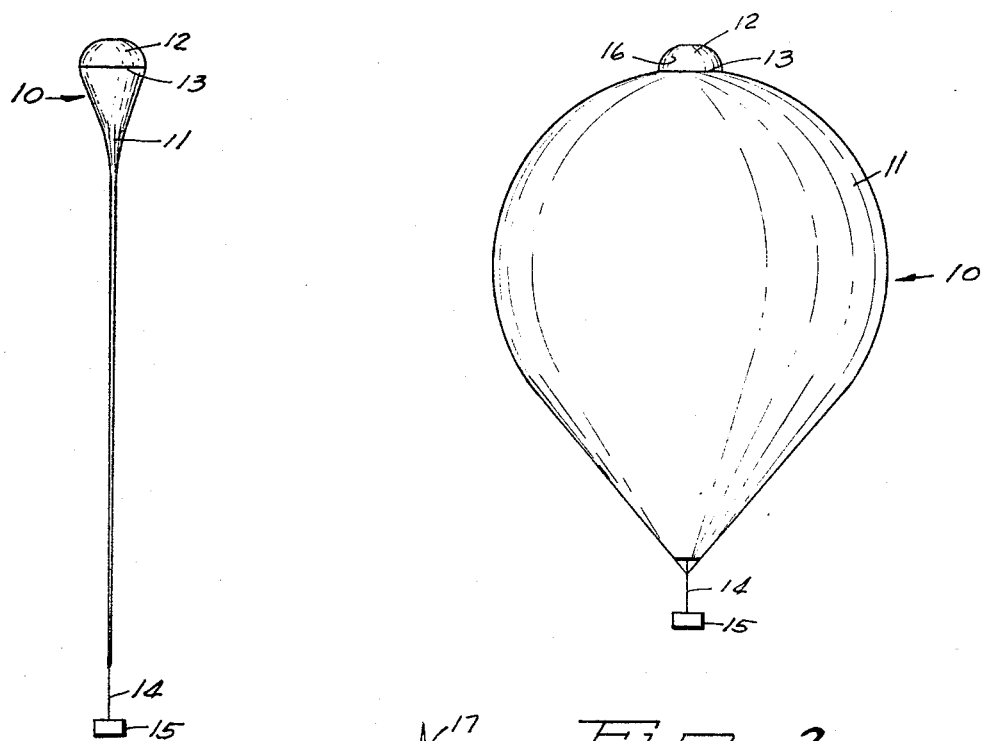
INVENTOR.
JOHN R. WINCKLER
JAMES A. WINKER
BY ATTORNEYS

United States Patent Office 3,270,987
Patented Sept. 6, 1966

3,270,987
BALLOON STRUCTURE WITH DISTRIBUTED
EXCESS MATERIAL
John R. Winckler, Minneapolis, Minn., and James A. Winker, Sioux Falls, S. Dak., assignors to Raven Industries, Inc., Sioux Falls, S. Dak., a corporation of South Dakota
Filed Dec. 14, 1964, Ser. No. 418,081
8 Claims. (Cl. 244—31)

The present invention relates to improvements in load carrying high altitude balloons and particularly to improved envelope structure capable of carrying heavier payloads.

The present invention is used primarily with balloons formed of lightweight flexible gas barrier materials such as polyethylene film or other plastics where the material may be formed in gores with the gores being attached to each other along seams to form the balloon envelope. Optimum designs are adopted for load carrying balloons wherein all stresses (and primarily vertical stresses) are uniform and equal at all points on the balloon skin. This can be accomplished for a balloon in stable flight but difficulties are encountered at balloon launching which cause non-uniform stressse due to overlapping and non-uniform deployment of the excess balloon material.

Balloon designs have been adopted which obtain optimum load carrying ability for balloon material strength.

A major problem exists in balloon construction aside from lift capability. The gas contained in the balloon at launch fills only a small bubble at the crown of the balloon, and the vast area of uninflated balloon skin drapes together in a stem or rope from the bubble on the balloon base, and the bubble must lift the entire payload plus the weight of the balloon material below it as the balloon is launched. The rope of material arranges itself almost completely at random with the result that the loading and stress is very non-uniform with respect to the balloon axis. Some regions will be highly stressed while others will have no stress at all, with the low stress resulting at the locations where the rope of material has gathered. The high stress results at the other side of the balloon where a single layer of material exists. The range of stresses and the maximum stress in a particular balloon cannot be accurately calculated or predicted because of the randomness of the drape pattern and the location of the drape can be located only after the balloon is inflated for launching. Certainly, in some cases the stress exceeds material strengths resulting in balloon failure. Most balloon failures occur at mid-altitude, during ascent, and it is suspected that this unequal stressing is the secondmost important contributing cause (after low temperature effects) to balloon failure. Efforts have been made to avoid the difficulties encountered at launching which have proven a limiting factor to total load carrying ability of a given balloon. If difficulties in launching can be avoided, a balloon can be used to carry a payload approaching 100% of its total load carrying ability. That is, the balloon can carry a payload wherein at full inflation at high altitudes the balloon material will be stressed to approaching 100% of its strength.

It is accordingly an object of the present invention to provide an improved balloon construction wherein the small bubble of gas which forms at the upper end of the balloon at ground level can lift the weight of the balloon material and the payload without overstressing the balloon material and wherein a payload can be carried which approaches 100% of the balloon carrying capacity at high altitudes.

A further object of the invention is to provide an improved balloon structure wherein the bubble of lifting gas formed at the upper end during launching does not cause unequal distribution of the balloon material below it and does not cause roping of the material at one side of the bubble or the formation of single layers of material at another side of the bubble when tend to overstress the material at launching.

A still further object of the invention is to provide an improved balloon structure which accommodates the small bubble of gas at launch and accommodates the increase in volume of the gas and the filling out of the balloon material as the balloon rises to higher altitudes and the gas expands and wherein the folds of material which form at launch tend to distribute and fill out uniformly during ascension of the balloon.

A further object of the invention is to provide a balloon structure which provides an effectively rigid band near the top of the balloon at inflation to distribute evenly the vast fold area of material during launching.

The present balloon design provides a practical mechanism for generating a circumferential tension band located near the equator of the balloon as it is inflated for launching at ground level or during the initial stages of ascent to high altitude. This circumferential tension band is formed by the junction between an upper dome portion and a lower body portion of the balloon. Circumferential tension is formed in this band since the "natural" volume of the balloon exceeds the volume provided by the upper dome portion. When the volume of the upper dome portion during inflation or ascent of the balloon approaches or exceeds that required to generate circumferential tension in the band, all material along the circumference of the band is fully and tightly deployed. The lower body portion then hangs in uniform folds from this circumferential tension band and the excess material is well distributed around the circumference of the inflated portion of the balloon during launch and initial ascent. In this way, the vast area of uninflated balloon skin is prevented from hanging on a stem or rope from the top of the balloon and is distributed uniformly around the balloon. The circumferential tension band at the junction of the upper dome portion and lower body portion acts in effect like a rigid ring.

Other objects, advantages and features will become more apparent with the teaching of the principles of the present invention in connection with the disclosure of the preferred embodiments thereof in the specification, claims and drawings, in which:

FIGURE 1 is an elevational view of a balloon, constructed and operating in accordance with the principles of the present invention, at the time of launching;

FIGURE 2 is an elevational view of the balloon of FIGURE 1 after it has reached flight elevation; and FIGURE 3 is a plan view of a gore such as is used in the construction of the balloon, with portions of the gore removed for convenience of illustration.

On the drawings:

FIGURE 1 illustrates a balloon envelope 10 after it has been inflated with a lifting gas and just at the time of launch. The gas has formed a bubble in the upper end and the material which will form the overall balloon envelope drapes uniformly downwardly. At the lower end are load lines 14 supporting a payload 15.

The balloon of FIGURE 2 is shown after it has ascended to a higher floating altitude with the gas bubble expanded to fill the balloon. The transformation of the volume of the gas bubble and the overall balloon envelope 10 from FIGURE 1 to FIGURE 2 illustrates the problem in handling the excess balloon material at the time of launch. Launching condition is shown in FIGURE 1, and FIGURE 2 shows the balloon as it becomes air borne and more fully inflated at very high altitudes.

In accordance with the principles of the present invention, the overall balloon unit 10 is constructed with an upper dome portion 12 and a lower body portion 11. The dome portion is preferably of a size so as to be 30–70% fully inflated at launch. That is, inasmuch as the total weight of the balloon material plus payload will be known, the volume of the bubble of lifting gas required to cause the balloon to ascend at launch is also known. The upper dome portion 12 is then designed to be of a size so that it will be 30–70% fully inflated with the lifting gas at the time of launch. As the balloon ascends and the gas expands at higher altitudes, the upper dome portion first becomes fully inflated and the body portion then subsequently begins to fill out uniformly until it is fully inflated in the shape shown in FIGURE 2.

The construction preferably employs an annular circumferential tension band at 13 which is the location where the upper dome portion joins the lower body portion. This band may be of adhesive backed tape or other material which can be heat sealed or otherwise suitably secured to the balloon material with the material uniformly distributed along the circumferential band 13.

The material of the overall balloon unit is a thin lightweight flexible plastic film such as lightweight polyethylene on the order of 1 mil in thickness. The same material is formed in vertical continuous one-piece gores which are joined to each other along their edges at seams formed either by cement or heat sealed to join the plastic gas barrier material of the gores.

A gore of the type which is used is illustrated in FIGURE 3 being of one piece, and having an upper end 17 shaped to form the dome portion 12 with the lower end 18 shaped to form the body portion of the balloon.

While the features of the structure are particularly useful in tapeless balloons, they may be utilized in tape balloons or balloons constructed in accordance with other generally recognized balloon structure principles.

The upper dome portion 12 has a generally spherical or semi-spherical shape and may be the form known as a "natural" shape. As will be fully appreciated by those versed in the balloon art, the natural shape is a clearly defined shape concept taking on proportions in accordance with the various factors of balloon flight including payload weight, volume of gas bubble at floating altitude, amount of balloon material required to support the payload weight, and so forth. The dome portion 12 then is formed of the desired shape from the equator upwardly of a size to be preferably 30–70% inflated at launching with a gas bubble of the size required to lift the balloon and its payload.

The lower body portion 11 may be constructed of a natural shape and is joined to the dome portion 12 at the location where their shapes intercept. At that location, a band is attached with the band having a tensile strength greater than the balloon material.

In other words, the balloon unit is formed of two balloons, with the first upper balloon comprising the top end only of a balloon of smaller size and the second lower balloon comprising a much larger full balloon with only the very top portion removed where it intercepts the top balloon so that the balloon unit has a continuous inner balloon chamber to permit the expansion of gas from the dome portion as the balloon ascends.

As will be observed from the foregoing, the present balloon design provides an effective circumferential tension band at the junction between the upper dome portion 12 and the lower body portion 11 of the balloon. In inflation for launching or during initial ascent circumferential tension may be formed in this band since the "natural" volume of the balloon may exceed the volume provided by the upper dome portion. When this volume of gas in the upper dome portion exceeds that required to generate circumferential tension in the band, all material along the circumference of the band is tightly deployed. The lower body portion then hangs in uniform folds and the excess material is well distributed around the circumference of the band during launch and initial ascent. This circumferential tension band acts like a rigid ring.

Thus, it will be seen that we have provided an improved balloon structure which meets the objectives and advantages above set forth. The circumferential tension band aids in deploying the excess balloon material during launch and ascent and the upper dome portion contains the bubble of lifting gas at launch with a minimum of excess material and avoids the disadvantages which have been responsible for a large portion of balloon failures at launch in constructions heretofore available. With the present structure it is possible to avoid failures at launching and permit carrying a payload utilizing 100% of the balloon capacity at floating altitude.

The drawings and specification present a detailed disclosure of the preferred embodiments of the invention, and it is to be understood that the invention is not limited to the specific forms disclosed, but covers all modifications, changes and alternative constructions and methods falling within the scope of the principles taught by the invention.

We claim as our invention:
1. A balloon structure comprising in combination,
a balloon envelope formed of a lightweight thin flexible material,
    said envelope having a lower body portion and an upper dome portion with a smaller circumference than the body portion and forming a bubble at the top end of the balloon envelope,
    said dome portion being inflated at launching of the balloon and said body portion inflating after launching as the gas within the dome portion expands at higher altitudes,
means for supporting a payload from the balloon envelope below the body portion,
    said envelope formed of a plurality of one-piece vertical gores of thin flexible film extending from the lower to the upper end of the balloon and joined at their side edges in seams with the gores shaped along the overall length to form said body and dome portions.

2. A high altitude balloon comprising in combination,
a balloon envelope formed of a lightweight thin flexible material,
    said envelope having a lower body portion and an upper dome portion with a smaller circumference than the body portion,
an annular circumferential band surrounding the envelope between said body portion and said dome portion,
    said band having material strength for constricting the expansion of said balloon,
    means attached to said envelope for inflating said dome portion at launch of the balloon,
    means for inflating said body portion after launch as the gas within the dome portion expands at higher altitudes,
and means for supporting a payload from the balloon envelope below the body portion.

3. A high altitude balloon comprising in combination,
a balloon envelope formed of a lightweight thin flexible material,
    said envelope having a lower body portion and an upper dome portion with a smaller circumference than the body portion,
an annular circumferential narrow band of material having a tensile strength substantially greater than said balloon envelope material and being secured to the flexible material of the balloon envelope between the body portion and dome portion with the envelope material uniformly distributed along the band circumferentially,
    means for inflating said dome portion at launch of the balloon and means for inflating said body portion after launch as the gas within the dome portion expands at higher altitudes, and means for supporting a payload from the balloon envelope below the body portion.

4. A high altitude balloon comprising in combination, a balloon envelope formed of a lightweight thin flexible material, said envelope having a lower body portion and an upper dome portion with a smaller circumference than the body portion and forming a bubble at the top end of the balloon envelope, means formed at said envelope for inflating said dome portion at launch, means for inflating said body portion from said dome portion after launch, and means for supporting a payload from the balloon envelope below the body portion.

5. A high altitude balloon comprising in combination, a balloon envelope formed of a lightweight thin flexible material, said envelope having a lower body portion and an upper dome portion with a smaller circumference than the body portion and forming a bubble at the top end of the balloon envelope, said dome portion being generally semi-spherical in shape, said dome portion having means for being inflated at launching of the balloon and said body portion having means for being inflated after launching as the gas within the dome portion expands at higher altitudes, and means for supporting a payload from the balloon envelope below the body portion.

6. A high altitude balloon structure comprising in combination, a balloon envelope formed of a lightweight thin flexible material, said envelope having a lower body portion and an upper dome portion with a smaller circumference than the body portion, said dome portion and body portion forming a circumferential band between them being under tension when the dome portion is inflated and supporting the folds of the body portion therebelow, and means for supporting a payload from the balloon envelope below the body portion.

7. A balloon structure comprising in combination, a balloon envelope formed of a lightweight thin flexible material, said envelope having a lower body portion and an upper dome portion with a smaller circumference than the body portion and forming a bubble at the top end of the balloon envelope, said dome portion being of a size to lift a payload at ground level when inflated 60-80% of full capacity with lifting gas, means for inflating said dome portion at launch of the balloon, means for inflating said body portion after launching as the gas within the dome portion expands thereinto at higher altitudes, and means for supporting a payload from the balloon envelope below the body portion.

8. A high altitude balloon structure comprising, a balloon envelope formed of a lightweight material, said balloon envelope having a circumferential band disposed thereabout and permanently secured to said lightweight material of said balloon envelope, said lightweight material secured to said band substantially uniformly thereabout, said band having a diameter less than the corresponding diameter of said balloon and a material strength exceeding the material strength of said envelope, whereby said band constrains the expansion of said balloon and uniformly supports said envelope therefrom, the upper portion of the balloon envelope above said band having a substantially smaller volume and diameter than the lower portion below said band, the upper portion being open to the lower portion for the free flow of gas from the upper to the lower portion, said upper portion being inflated at launch to support the material of said lower portion below said band with the lower portion being uninflated, the lower portion becoming inflated by the expansion of gas in the upper portion as the balloon rises to higher low pressure altitudes.

References Cited by the Examiner

UNITED STATES PATENTS

| | | | |
|---|---|---|---|
| 1,612,643 | 12/1926 | Mulholland | 46—87 |
| 2,415,818 | 2/1947 | Frieder et al. | 244—32 |
| 2,790,479 | 4/1957 | Mastenbrook | 244—31 |
| 2,960,282 | 11/1960 | Winzen | 244—31 |

MILTON BUCHLER, *Primary Examiner.*

R. G. BESHA, *Assistant Examiner.*